(12) United States Patent
Lockery et al.

(10) Patent No.: US 6,555,767 B1
(45) Date of Patent: Apr. 29, 2003

(54) COMPOSITE LOAD CELL

(75) Inventors: Harry E. Lockery, Sudbury, MA (US); Robert L. Gray, Wayland, MA (US)

(73) Assignee: Flintec, Inc., Hudson, MA (US)

( * ) Notice: Subject to any disclaimer, the term of this patent is extended or adjusted under 35 U.S.C. 154(b) by 36 days.

(21) Appl. No.: 09/642,644

(22) Filed: Aug. 22, 2000

(51) Int. Cl.[7] .............................. G01L 1/04; G01L 1/22
(52) U.S. Cl. ................. 177/211; 177/229; 73/862.627; 73/862.637; 29/593
(58) Field of Search ................. 177/211, 229, 177/184, 187; 73/812, 849, 862.627, 862.637; 29/593

(56) References Cited

U.S. PATENT DOCUMENTS

| | | | |
|---|---|---|---|
| 4,261,429 A | | 4/1981 | Lockery ...................... 177/211 |
| 4,396,079 A | | 8/1983 | Brendel ....................... 177/179 |
| 4,411,327 A | | 10/1983 | Lockery et al. ............. 177/211 |
| 4,489,797 A | * | 12/1984 | Gordon ....................... 177/187 |
| 4,506,557 A | | 3/1985 | Jacobson et al. ......... 73/862.65 |
| 4,506,746 A | | 3/1985 | Lockery ...................... 177/211 |
| 4,548,086 A | | 10/1985 | Kästel ......................... 73/1.13 |
| 4,554,987 A | * | 11/1985 | Dillon ......................... 177/134 |
| 4,565,255 A | | 1/1986 | Sarrazin ...................... 177/211 |
| 4,593,778 A | * | 6/1986 | Konishi et al. ............. 177/185 |
| 4,718,287 A | * | 1/1988 | Mishliborsky .............. 177/229 |
| 4,785,673 A | * | 11/1988 | Aumard ...................... 177/229 |
| 4,898,255 A | | 2/1990 | Gaines ........................ 177/211 |
| 4,993,506 A | | 2/1991 | Angel .......................... 177/211 |
| 5,510,581 A | * | 4/1996 | Angel .......................... 177/211 |
| 5,512,713 A | * | 4/1996 | Naito et al. ................. 177/211 |
| 5,569,887 A | * | 10/1996 | Naito et al. ................. 177/184 |
| 5,604,336 A | * | 2/1997 | Johnson ...................... 177/229 |
| 5,756,943 A | * | 5/1998 | Naito et al. ................. 177/211 |
| 5,859,390 A | * | 1/1999 | Stafford et al. ............. 177/187 |
| 5,929,390 A | * | 7/1999 | Naito et al. ................. 177/211 |

OTHER PUBLICATIONS

"Silicone" from "Encyclopedia Britannica Online" <http://www.search.ed.com/bol/topic?eu=69526&sctn=1&pm=1> 1994.*

* cited by examiner

Primary Examiner—Randy W. Gibson

(57) ABSTRACT

A low cost strain gage load cell made without compromising accuracy and stability by a composite structure using a sensing element formed of a load cell quality material, such as metal or a metal alloy, and adjoining non-sensing elements formed of a molded plastic material. Stable and secure joints between the load cell sensing element and the plastic non-sensing element of such a load cell are provided using various structures and related structural manufacturing methods. For example, non-sensing elements, such as a mounting block to mount the load cell to a base support and a load application block to receive a load platform, are formed of an injection molded plastic and sensing elements, such as first and second parallel beams of a load cell quality metal alloy, have ends embedded in the injected molded plastic non-sensing elements. The composite load cell structure is applicable to many different types of load cell designs.

39 Claims, 6 Drawing Sheets

COMPOSITE LOAD CELL

BACKGROUND OF THE INVENTION

1. Field of the Invention

The present invention relates to strain gage load cells for weighing, force measurement, and pressure measurement.

2. Description of the Related Art

A strain gage load cell is basically a metal structure subject to a load to be measured, with strain gages sensing strain in the loaded structure. The strain gages are connected in an electrical bridge circuit. Power is supplied acros one bridge diagonal, and an output signal across the other diagonal is used as an indication of the load on the metal structure. Strain gage load cells have been used extensively for weighing, force measurements, and pressure measurements since the middle of the $20^{th}$ century.

The output signal from a strain gage load cell derives entirely from changes in the resistance of the strain gages. Accurate load measurements require that the strain gages sense the strain in the loaded structure accurately, and also that the strains in the loaded structure are true measures of the load on the metal structure. Only certain specially heat treated metal alloys, selected for low mechanical hysteresis and low creep are suitable for use in the loaded metal structure in high accuracy strain gage load cells for "legal for trade" weighing. It is also important to insure that the load is transferred to the metal structure without errors caused by slip or shifting of the point of load application.

Extensive efforts to make strain gage load cells more accurate have led to hundreds of different strain gage load cell designs now known in the art. Known strain gage load cells are all-metal designs. Most high accuracy strain gage load cells have both the loaded metal structure and the load application parts machined from one piece of load cell quality alloy. This provides ideal load introduction and measurement of applied strains, but the cost for material and machining are high.

Some planar gage type load cells for low load ratings have sensing structures machined from a flat sheet of metal, with fold-back arms and other load application and support parts of metal bolted to the sensing structure. This lowers the cost of material and machining, but the assembly cost is increased, and the repeatability is generally impaired.

SUMMARY OF THE INVENTION

A main object of the present invention is to provide strain gage load cells that are less expensive to make than prior art strain gage load cells, while maintaining high accuracy and repeatability.

This object is obtained by a strain gage load cell with a load sensing structure, comprising a load cell sensing element of load cell quality material and a non-sensing element of a plastic material joined to said sensing element.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENTS

Reference will now be made in detail to the present preferred embodiments of the invention, examples of which are illustrated in the accompanying drawings.

Figure 1A:
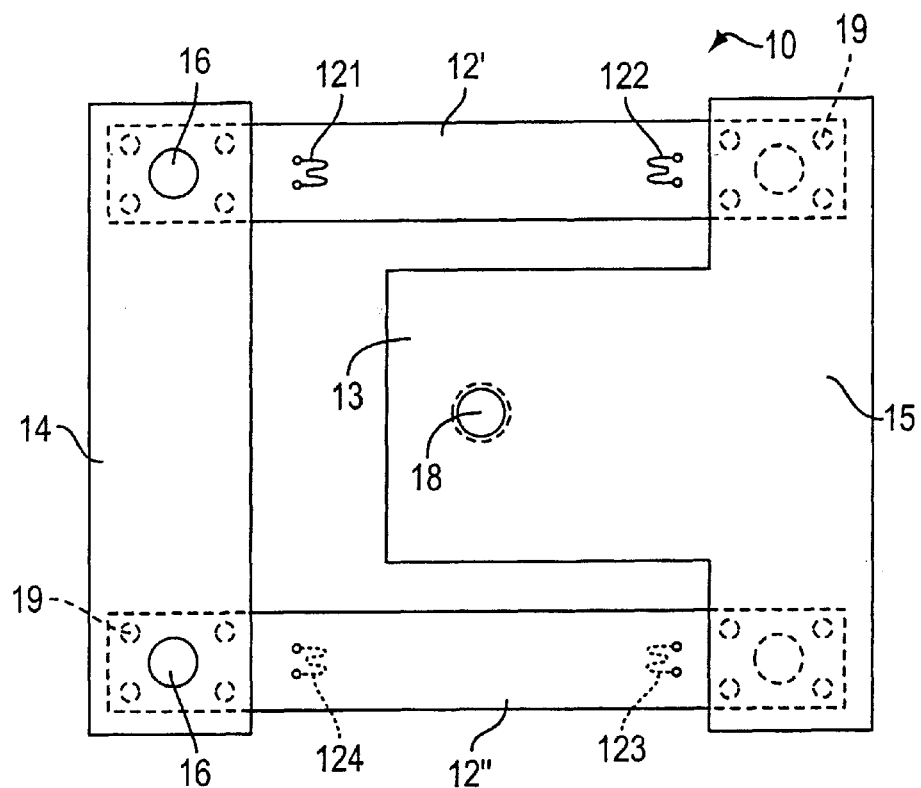
FIG. 1A is a top view of a planar gage strain gage load cell with a single fold-back arm according to a preferred embodiment of the invention.
Figure 1B:
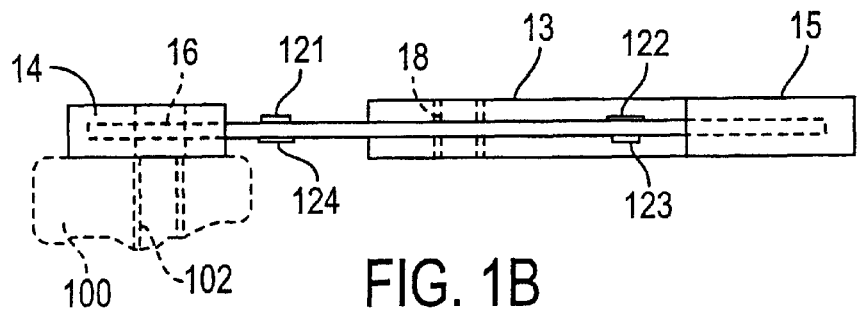
FIG. 1B is a side view of the load cell shown in FIG. 1A when unloaded.
Figure 1C:
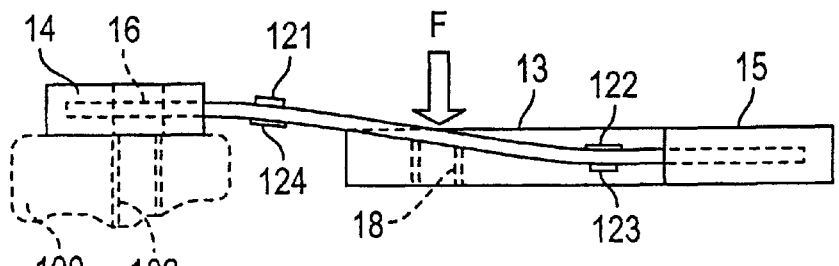
FIG. 1C is a side view of the load cell shown in FIG. 1A when loaded.

FIGS. 1A–1C show different views of a load cell 10 according to a preferred embodiment of the invention. The load cell 10 comprises two flat parallel and coplanar bending beams 12' and 12" of a load cell quality material, such as a load cell quality aluminum or stainless steel alloy. The ends of the bending beams 12', 12" are joined to end pieces 14 and 15 of plastic by injection molding. One end piece 14 has through holes 16 for bolts (not shown) for mounting the load cell 10 as a cantilever on a base 100 via threaded holes 102. The other end piece 15 has a fold-back arm 13 extending between the two bending beams 12', 12". A threaded load application hole 18 in the fold-back arm 13 is centered between the midpoints of the bending beams 12', 12". The load application hole 18 is provided for mounting of a load platform (not shown). The geometry of the load cell 10, with one end 14 mounted on a bending resistant support 100, and a fold-back arm 13 with a loading hole 18 between the midpoints of the bending beams 12', 12", makes the bending beams 12', 12" bend in a controlled mode, so they form a shallow S-shape as shown in FIG. 1C when a load "F" is applied, as is well known in the art.

Strain gages 121–124 are bonded to the bending beams 12' and 12" near the junction. between the bending beam 12' and the end pieces 14' and 15, as is common in the art. Strain gages 121 and 122 are shown bonded to the top surface of bending beam 12', while strain gages 123 and 124 are shown bonded to the underside of bending beam 12". This arrangement of the strain gages simplifies correction for differences in strain gage sensitivities by resistive de-sensitizing, e.g. as described in U.S. Pat. No. 4,979,580.

When the bending beams 12' and 12" flex as shown in FIG. 1C, strain gages 121 and 123 will sense tensile strain, and strain gages 122 and 124 will sense compressive strain, so a strain gage bridge containing the four strain gages 121–124 will become unbalanced in proportion to the magnitude of the load on the load "F", as is well known in the art. If all four strain gages 121–124 are accurately placed and have the same sensitivities, the output from the bridge will be insensitive to positional variations of load placement on a load platform.

The end piece 14 and end piece 15 with fold-back arm 13, are plastic material parts, fastened to the ends of bending beams 12', 12" by injection molding. The ends of the beams 12', 12" are inserted into molds, which are filled by a plastic compound under high temperature and pressure. After curing and cooling, the plastic material will enclose the ends of the beams 12', 12" tightly, but it may not adhere well to the metal beams. In order to get permanent, creep free joints between the plastic material and the metal beams, even when the plastic material will not adhere reliably to the metal beams 12', 12", the ends of the beams 12', 12" can be provided with spaced apart gripping surfaces for the plastic material, for instance by punching or machining holes 19 in the ends of the metal beams 12', 12" as shown in FIG. 1A, or by cutting notches in the edges of the beams 12', 12". During the injection molding process, the plastic material is forced to fill such holes 19 and notches under high pressure, thereby forming a matrix of plastic and metal which keeps the ends of the beams 12', 12" firmly joined to the plastic end pieces 14, 15 when the plastic has cured. In most cases, the plastic material will shrink or expand slightly during curing and cooling. A typical injection molding material, such as polypropylene sulfide with 40% glass fiber for reinforcement, shrinks about 0.1% during curing. This causes firm prestress forces between the plastic material and the gripping surfaces, which further enhances the solidity of the joints. Various injection molded plastic compounds with strength data similar to aluminum are readily available in today's market.

Through holes 16 for mounting bolts in the left hand end piece 14 are formed in the plastic during the molding process by inserts in the injection mold, with matching holes in the bending beams 12', 12". One or more threaded holes 18 for mounting of a load platform on the right hand fold-back arm 13 are formed by similar inserts in the mold.

Figure 2:
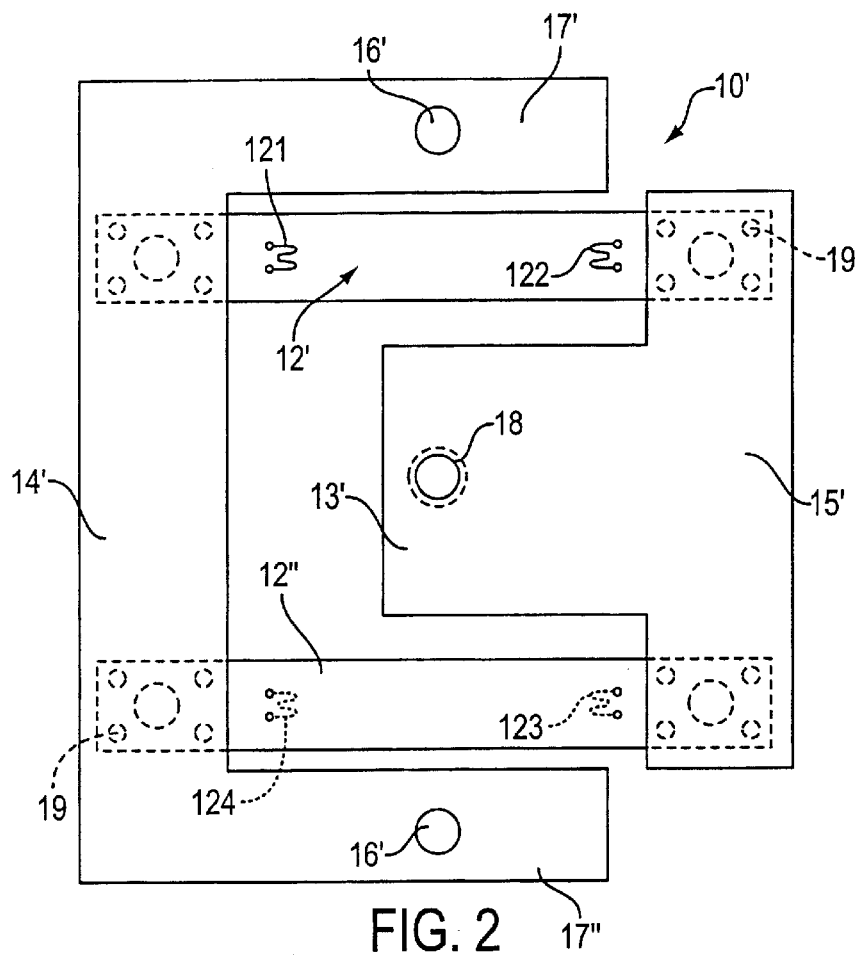
FIG. 2 is a top view of a planar gage strain gage load cell with lateral fold-back arms according to a preferred embodiment of the invention.
Figure 3:
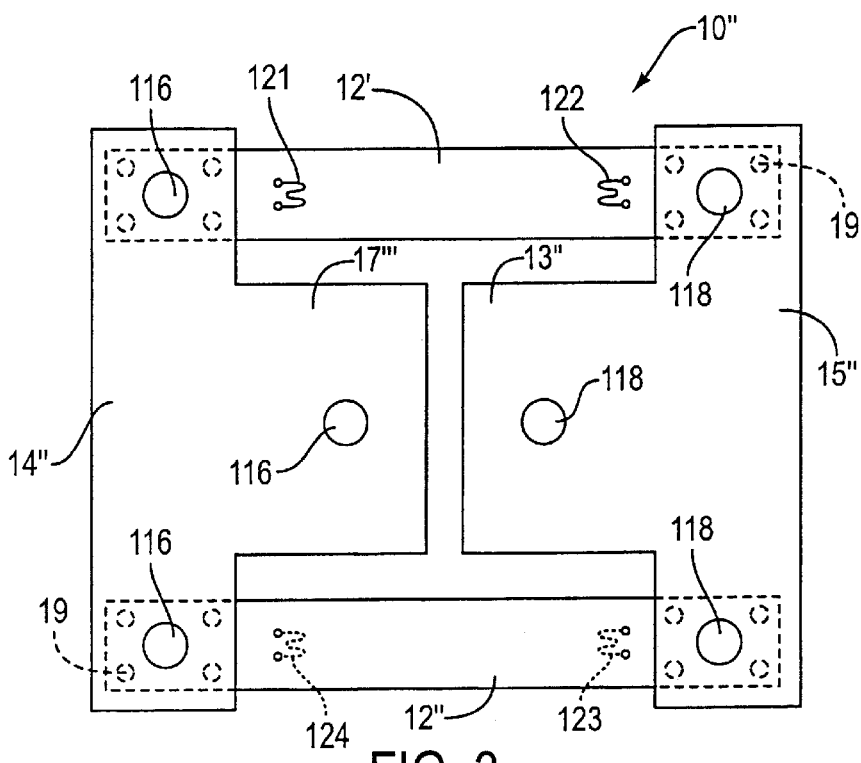
FIG. 3 is a top view of a planar gage strain gage load cell with two central fold-back arms according to a preferred embodiment of the invention.

FIGS. 2 and 3 are top views of planar bending beam load cells 10' and 10" according to further preferred embodiments of the invention. These load cells 10', 10" are functionally equivalent to the load cell 10 shown in FIGS. 1A–1C, and equivalent parts are designated by the same reference numbers. The differences between load cells 10, 10' and 10" are in the mounting methods employed.

Load cell 10', as shown in FIG. 2, is designed to be mounted on separated supports (not shown) via holes 16' in two parallel fold-back arms 17', 17" of plastic material extending from plastic end piece 14'. As embodied herein, fold-back arms 17', 17" and end piece 14' are formed of one integral injection molded plastic material. The fold-back arms 17', 17" eliminate bending stresses on the supports. Similar to the embodiment of FIGS. 1A–1C, fold-back arm 13' and end piece 15' are also formed of an injection molded plastic material.

Load cell 10", as shown in FIG. 3, has a central fold-back arm 17''' extending from end piece 14" and a central fold-back arm 13" extending from end piece 15" with corresponding mounting holes 116 and 118 equidistant from the end pieces 14" and 15". Two pairs of further mounting holes 116 and 118 are arranged resepctively in the end pieces 14 and 15. Each set of three mounting holes 116, 118 form a triangle, which provides stable support and mounting on a base (not shown) at one end, and for support and mounting of a load platform (not shown) at the other end. As embodied herein, end piece 14" with fold-back arm 17''' and end piece 15" with fold-back arm 13" are formed of an injection molded plastic material. The load platform is preferably centered over the gap between the two fold-back arms 17''', 13", so the beams 12', 12" bend in a symmetrical shallow S-shape. Load platform mounting holes 118 also may be formed as threaded holes, such as shown for load cell 10 in FIG. 1.

Side views of load cells 10', 10" shown in FIGS. 2 and 3 would be essentially similar to FIGS. 1B and 1C described above. The bending beams 12', 12" are in both cases forced into a controlled bending mode, forming shallow S-shapes, and the strain gages 121–124 will in both cases sense strains equivalent to the strains sensed in load cell 10.

Figure 4A:
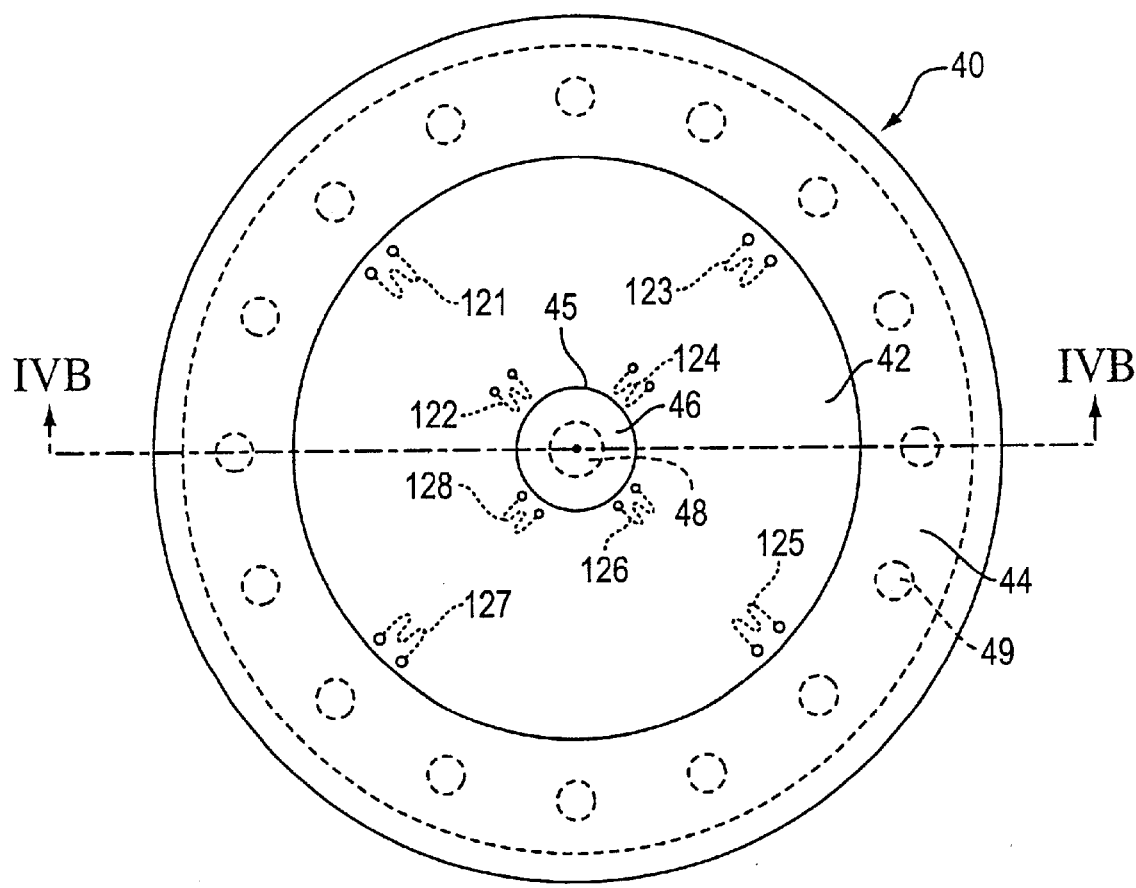
FIG. 4A is a top view of a membrane type load cell according to a preferred embodiment of the invention.
Figure 4B:
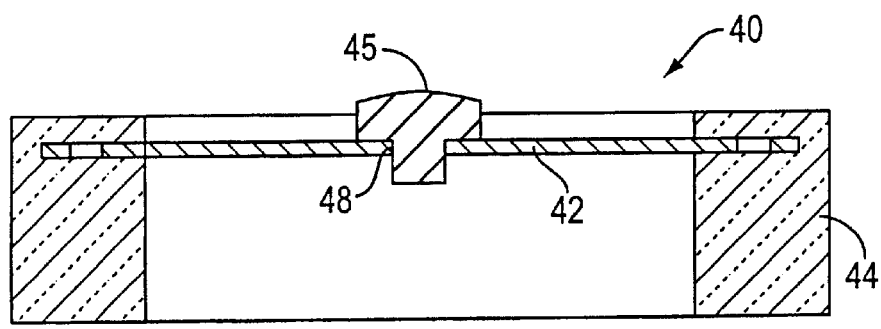
FIG. 4B is a vertical section along the line "IVB—IVB" through the center of the load cell shown in FIG. 4A.

A membrane type load cell 40 according to another preferred embodiment of the invention is shown in FIGS. 4A and 4B. In this case, the sensing member is a flat membrane 42 of a load cell quality material, such as a load cell quality aluminum or stainless steel alloy. The membrane 42 is joined at its rim to a plastic cylinder 44, and a metallic load button 45 is suitably fastened to a central hole 48 in the membrane. When a load is applied to the load button 45, the membrane 42 will deflect in a controlled mode with an inflection zone midway between the inner edge of the cylinder 44 and the outer edge of the load button 45. A number of strain gages 121–128 arranged to sense radial strain are bonded to the membrane 42 on each side of the inflection zone, as shown in FIG. 4A. The strain gages are preferably bonded to the underside of the membrane 42, where they are protected. All odd numbered strain gages will sense compressive strain, while all even numbered strain gages will sense tensile strain. Alternatively, the even numbered strain gages may be arranged to sense tangential strain, while the odd numbered strain gages remain arranged to sense radial strain, as is well known in the art. The strain gages 121–128 are connected in a bridge circuit, which will provide an output signal indicating the load on the load button.

The membrane 42 is preferably joined to the cylinder 44 by injection molding. To assure firm joining of the injection molded plastic cylinder 44 to the metal membrane 42, gripping surfaces are provided by punched or machined holes 49 inside the rim of the membrane 42, as described above with reference to element 19 of load cell 10 as shown in FIGS. 1A–1C.

The load cell 40 may also be used as a pressure gage instead of as a load cell. When used as a pressure gage, the device 40 needs not have a load button 45, but the bottom of the cylinder 44 must be sealed so a reference pressure can be maintained on the underside of the membrane 42. A pressure differential between the two sides of the membrane 42 will cause a net force to act on the membrane 42, causing a deflection similar to the one described above.

Figure 5B:
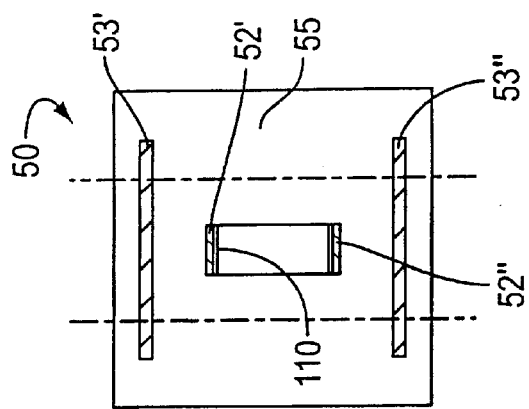
FIG. 5B is a vertical section along line "VB—VB" through the load cell shown in FIG. 5A.
Figure 5A:
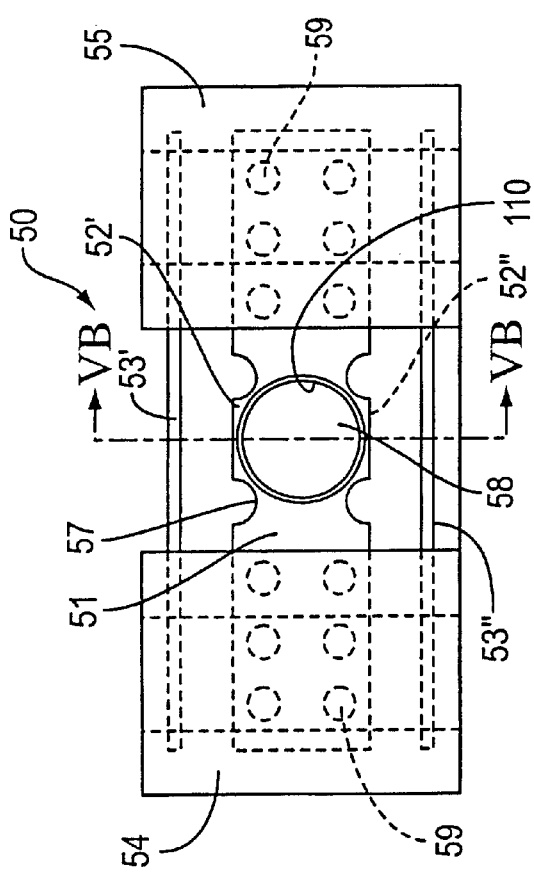
FIG. 5A is a side view of a load cell with a bending beam sensing structure of metal and additional metal flexures according to a preferred embodiment of the invention.
Figure 5C:
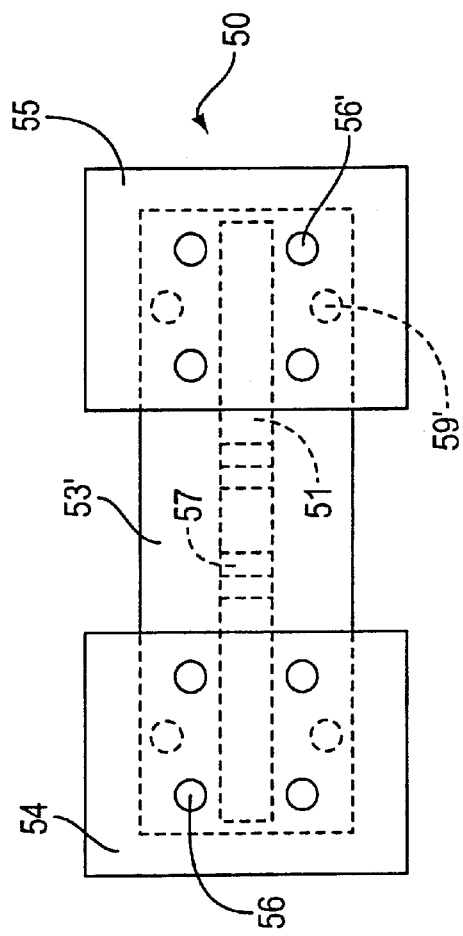
FIG. 5C is a top view of the load cell shown in FIG. 5A.

A reinforced double bending beam load cell 50 according to another preferred embodiment of the invention is shown in FIGS. 5A–5C. FIG. 5A is a lateral view of the load cell 50, FIG. 5B is a vertical section through the load cell 50 along line "VB—VB" in FIG. 5A, and FIG. 5C is a top view of the load cell 50. The sensing member of this load cell 50 is a double-bending beam structure 51 machined from a rectangular-bar of load cell quality metal alloy. A large hole 58 and four surrounding notches 57 are machined at the center of the metal bar so two bending beams 52' and 52" are formed. Two additional bending beams 53', 53" are arranged one above and one below the bending beam structure 51, and plastic end pieces 54 and 55 are injection molded over the ends of the bending beam structure 51 and the ends of the additional bending beams 53', 53". A number of small holes 59 are machined through the ends of the bending beam structure 51 as shown in FIG. 5A, and similar holes 59' are punched or machined through the ends of the additional bending beams 53', 53" as shown in FIG. 5C to provide gripping surfaces for the injection molded plastic in the end pieces 54, 55. These gripping surfaces ensure firm, slip free joints between the plastic end pieces 54, 55 and the metal bending beams 51, 53', 53", as explained in the text above.

One end block 54 will be bolted to a base via mounting holes 56, so the load cell 50 extends as a cantilever from the base. When a load is placed on the other end piece 55 with mounting holes 56', the loaded end piece 55 will deflect, but it is forced to remain vertical by the parallelogram action of the two sensing bending beams 52' and 52" and the two additional bending beams 53', 53". The bending beams 52', 52", 53', 53" will thus be forced to form shallow S-shapes when the load cell 50 is loaded.

Four strain gages (not shown) are bonded to the inside of the large hole 58 near the notches 57 to sense the strain in the bending beam structure 51, and are connected in a bridge providing an output signal from the load cell 50, as is common in the art.

The large hole 58 in the sensing bending beam structure makes it possible to provide hermetic sealing of the strain gages in load cell 50. This is achieved by inserting a tube 110 of very thin metal through the hole 58, inside the strain gages, as indicated in FIGS. 5A and 5B, and then flanging the ends of the tube in place. The flanges can then be welded to the rims of the hole 58 by plasma welding without damage to the strain gages.

The additional bending beams 53', 53" carry no strain gages. They serve only as flexures to make the load cell 50 more resistant to bending moments and side forces.

Figure 6A:
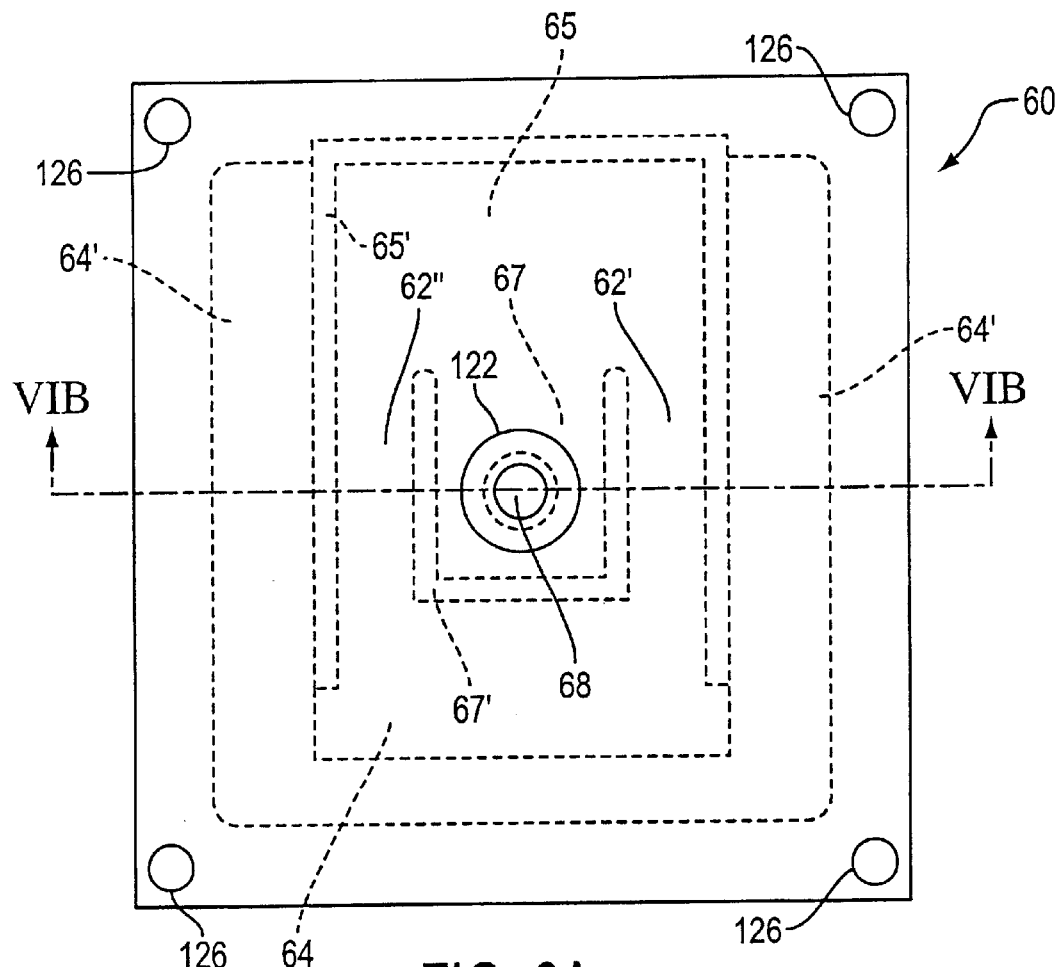
FIG. 6A is a top view of a planar beam type strain gage load cell for compression or tension loading according to a preferred embodiment of the invention.
Figure 6B:
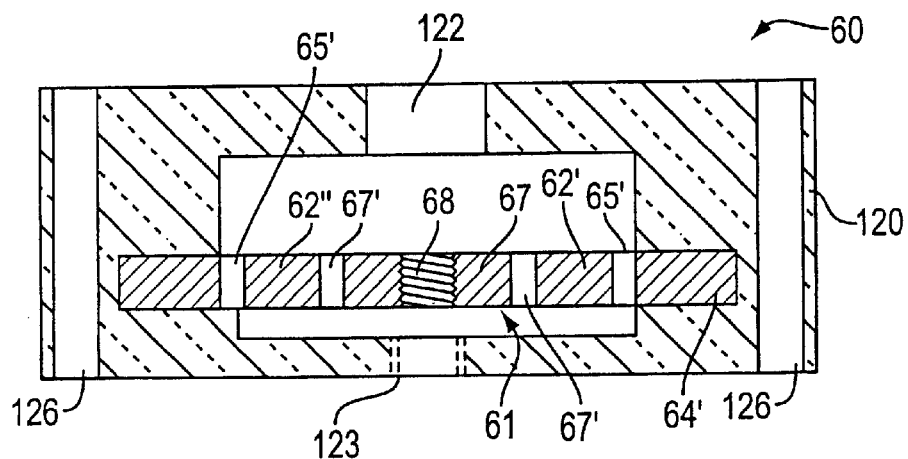
FIG. 6B is a vertical section along line "VIB—VIB" through the load cell shown in FIG. 6A.

A planar gage load cell 60 according to a further preferred embodiment of the invention is shown in FIGS. 6A and 6B. FIG. 6A is a top view of the load cell 60, and FIG. 6B is a vertical section through the load cell 60 along line "VIB—VIB" in FIG. 6A. In this case, the sensing structure is a planar bending beam gage 61 similar to the complete load cell 10 shown in FIG. 2. The complete planar bending beam gage 61 is machined from a sheet of load cell quality metal alloy, and it comprises two parallel and coplanar bending beams 62', 62" with end pieces 64 and 65. The end piece 65 is connected to a fold-back arm 67, which includes a loading hole 68. The end piece 64 extends into two parallel fold-back arms 64'. The fold-back arms 64' and 67 are formed by narrow cuts 65' and 67' in the sheet forming the gage 61. Strain gages (not shown) are bonded to the bending beams 62', 62" in the same way as strain gages 121–124 are bonded to bending beams 12', 12" in the load cell 10 shown in FIGS. 1A–1C.

The entire planar bending beam gage 61 is injection molded into a plastic box 120, which serves as a base and a protective cover for the sensing gage 61. Through holes 126 can be used for bolting of the load cell 60 to a foundation in certain applications. An opening 122 in the top of the plastic box 120 is an entrance opening for a load application rod (not shown), and a threaded hole 123 at the bottom of the box 120 can be used in conjunction with the threaded hole 68 to form an in-line load cell arrangement. The hole 123 also provides access to the lower end of the load application rod. When a downward or an upward directed load is applied to the threaded hole 68, the bending beams 62', 62" will flex to form shallow S-shapes, and the output from a bridge circuit including the strain gages provides a measure of the applied load. Creep free joints between the gage 61 and the plastic box 120 are not required in this design, because all critical joints are formed in the solid metal plate forming the gage 61.

Figure 7A:
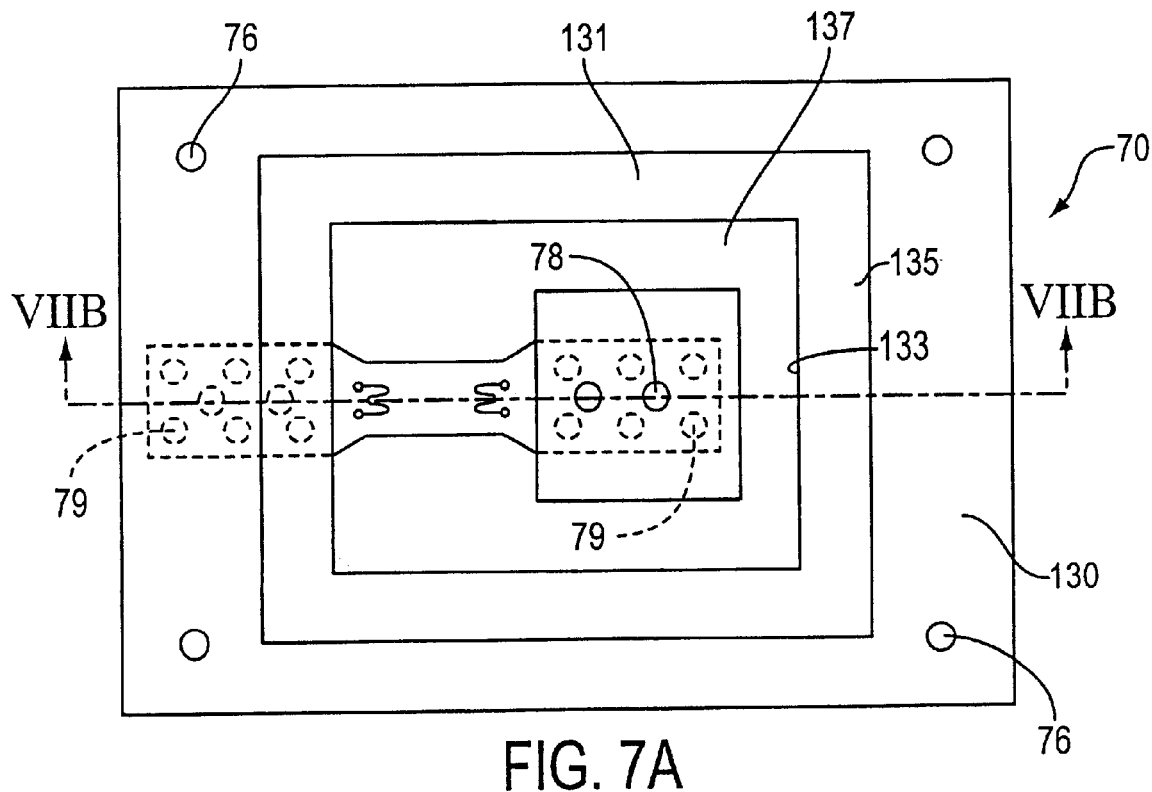
FIG. 7A is a top view of a sealed dual bending beam strain gage load cell according to a preferred embodiment of the invention.
Figure 7B:
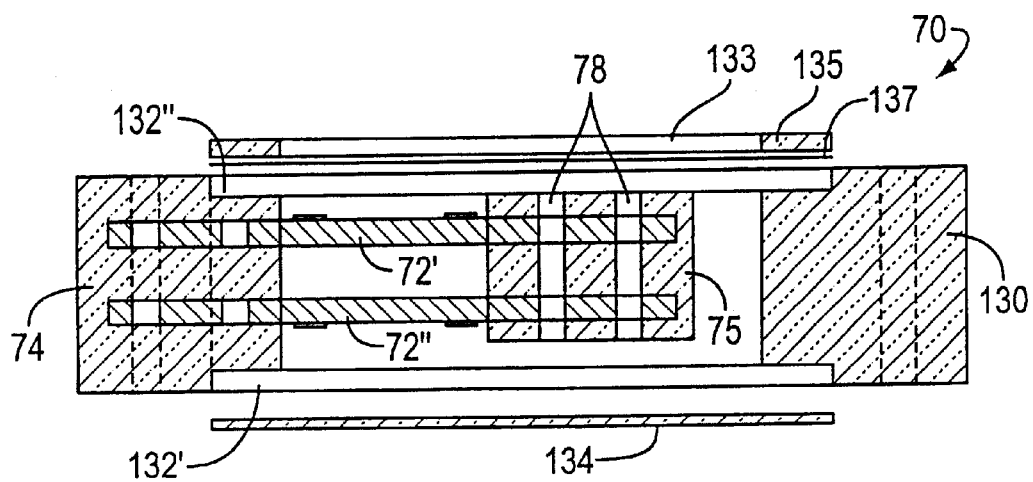
FIG. 7B is a vertical section, partially exploded, along line "VIIB—VIIB" through the load 1cell shown in FIG. 7A.

FIGS. 7A and 7B show an encapsulated double bending beam load cell 70 according to another preferred embodiment of the invention. FIG. 7A is a top view of the load cell 70, and FIG. 7B is a vertical section through the load cell 70 along line "VIIB—VIIB" in FIG. 7A. The load cell 70 comprises two bending beams 72', 72" of load cell quality metal alloy, with two end pieces 74 and 75 of plastic. The two bending beams 72', 72" are arranged on top of each other at a constant distance defined by the end pieces 74, 75, which are injection molded over the ends of the beams 72', 72". The end piece 74 is part of a frame 130 around the bending beams 72', 72", and the second end piece 75, which is movable up or down. The frame 130 has mounting holes 76, and the movable end piece 75 has a pair of threaded holes 78 for a load application device (not shown).

The ends of the bending beams 72', 72" are shaped as shown in FIG. 7A, and have holes 79 or notches providing gripping surfaces for the plastic in the end pieces 74, 75, as explained earlier. When a load is applied to the movable end piece 75, the beams 72', 72" will deflect in the form of shallow S-shapes, forming inflection zones near the joints with the end pieces 74 and 75. Strain gages (not shown) are bonded to the bending beams 72', 72" near these inflection zones, and are connected in a bridge circuit providing an output signal proportional to the load on the movable end piece 75.

The plastic frame 130 has a depression 132' at the bottom for sealable mounting of a removable cover 134, and a second depression 132" on the top for mounting of a soft seal 137 with a seal frame 135. The seal frame 135 has a central through opening to allow access to the soft seal 137. The soft seal 137 is preferably made from a thin fabric, such as silk, impregnated by nitrite rubber. Mounting bolts for a load application device (not shown) are screwed into the mounting holes 78 through the seal 137, so a tight seal is formed over the inner parts of the load cell 70. The soft seal 137 allows the movable end piece 75 to move in response to an applied load, while adding only negligible force components in the load direction. This type of load cell has important applications in the food industry, where the load cell 70 and all other devices must be cleaned frequently, such as by water spray.

The external shapes of the injection molded plastic parts shown in all the examples above are determined by the molds used during the injection molding process. The mold will include protrusions on the inside in non-critical parts of the plastic pieces, as is well known in the art, both to ensure even curing of the plastic material, and also to reduce the amount of plastic used. The pockets formed in the finished plastic pieces by such protrusions in the mold are not shown in the figures described above, because their depiction would obscure details important for an understanding of the invention.

Injection molded blocks being part of load cells according to the preferred embodiments of the invention also provide an inexpensive way to provide cavities integrally formed as part of the injection molded blocks for housing of interconnections between strain gages, and for trimming resistors, amplifiers, A/D converters, etc., as will be readily understood by those skilled in the art. Such cavities are also not shown in the figures described above.

The function of load cells according to the invention is the same as corresponding load cells made entirely from metal. A main advantage of the invention is low cost, especially for the preferred embodiments of load cells 40, 50 and 70 as shown in FIGS. 4A–4B, 5A–5C, and 7A–7B, where equivalent prior art load cells required costly machining from a solid block of expensive load cell quality metal alloy. Load cells 10, 10', and 10" as shown in FIGS. 1A–1C, 2 and 3A have a further advantage that the fold-back arms are much more rigid than in prior art load cells where the fold-back arms were machined from thin sheets of metal. And, in all cases, there is the advantage of being able to provide mounting cavities for interconnections and the like in and as an integral part of the injection molded plastic pieces at minimal cost.

The advantages of the invention are most apparent in load cells for small rated loads, where there are large markets if the price is right. The preferred embodiments of the invention described above have been with various types of strain gage load cells used for small rated loads, but the invention is applicable to any type of load cell.

The scope of the invention shall not be limited by any statement in the text above, nor by any detail of the accompanying figures. For example, in the embodiments presented above the sensing elements have been described as made of a load cell quality material, embodied herein as a load-cell quality metal or metal alloy, but this is not a requirement of the invention. Today, there are new developments in the fields of ceramics and glasses, which in the future may make such materials, or related materials, suitable for load cell sensing elements.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A strain gage load cell comprising: a load cell sensing element of load cell quality material and a non-sensing element of a plastic material directly and fixedly coupled to said sensing element.

2. A strain gage load cell comprising: a load cell sensing element of load cell quality material and a non-sensing element of a plastic material joined to said sensing element, wherein said non-sensing element is formed of an injection molded plastic and said sensing element has a gripping surface embedded in said injected molded plastic non-sensing element.

3. A strain gage load cell according to claim 2, wherein said load sensing element comprises a first beam formed of a flat piece of transducer quality metal alloy and having ends with gripping surfaces in the form of holes or notches, and plastic non-sensing elements are injection molded over said first beam ends.

4. A strain gage load cell according to claim 3, wherein said load sensing element further comprises a second beam having a similar formation as said first beam, and wherein plastic non-sensing elements are injection molded over the ends of both said first and second beams so said first and second beams are fixed in parallel relationship to each other.

5. A strain gage load cell according to claim 4, wherein said first and second beams are coplanar, and at least one of said non-sensing elements forms a fold-back arm so the beams are forced to act as guided bending beams.

6. A strain gage load cell according to claim 4, wherein said first and second beams are arranged spaced apart on top of each other to form a double bending beam load sensing structure, and said plastic non-sensing elements serve as a mounting block and a load application block.

7. A strain gage load cell according to claim 6, wherein at least said plastic mounting block or load application block is injected molded with an integral cavity formed therein for housing interconnections between strain gages or other electronic components for the load cell.

8. A strain gage load cell according to claim 4, wherein a first plastic non-sensing element at one end of said first and second beams serves a mounting block to mount the load cell to a base support.

9. A strain gage load cell according to claim 8, wherein a second plastic non-sensing element at the other end of said first and second beams serves as a load application block to receive a load platform.

10. A strain gage load cell according to claim 9, wherein said second plastic non-sensing element is formed with a fold-back arm positioned generally centrally between said first and second beams to receive a load platform thereon.

11. A strain gage load cell according to claim 10, wherein said first plastic non-sensing element is formed with a fold-back arm positioned generally centrally between said first and second beams to mount the load cell to a base support.

12. A strain gage load cell according to claim 10, wherein said first plastic non-sensing element is formed with a pair of fold-back arms positioned outside and generally parallel to said first and second beams to mount the load cell to a base support.

13. A strain gage load cell according to claim 11, wherein at least said plastic mounting block or load application block is injected molded with an integral cavity formed therein for housing interconnections between strain gages or other electronic components for the load cell.

14. A strain gage load cell according to claim 12, wherein at least said plastic mounting block or load application block is injected molded with an integral cavity formed therein for housing interconnections between strain gages or other electronic components for the load cell.

15. A strain gage load cell comprising: a load cell sensing element of load cell quality material and a non-sensing element of plastic material joined to said sensing element, wherein said non-sensing element is formed of an injection molded plastic and said sensing element has a gripping surface embedded in said injection molded plastic non-sensing element, said load sensing element comprises a first beam formed of a flat piece of transducer quality metal alloy and having ends with gripping surfaces in the form of holes or notches, and plastic non-sensing elements are injection molded over said first beam ends.

16. A strain gage load cell according to claim 15, wherein said load sensing element further comprises a second beam having a similar formation as said first beam, and wherein plastic non-sensing elements are injection molded over the ends of both said first and second beams so said first and second beams are fixed in parallel relationship to each other.

17. A strain gage load cell according to claim 16, wherein said first and second beams are coplanar, and at least one of said non-sensing elements forms a fold-back arm so the beams are forced to act as guided bending beams.

18. A strain gage load cell according to claim 16, wherein said first and second beams are arranged spaced apart on top of each other to form a double bending beam load sensing structure, and said plastic non-sensing elements serve as a mounting block and a load application block.

19. A strain gage load cell according to claim 18, wherein at least said plastic mounting block or load application block is injected molded with an integral cavity formed therein for housing interconnections between strain gages or other electronic components for the load cell.

20. A strain gage load cell according to claim 16, wherein a first plastic non-sensing element at one end of said first and second beams serves a mounting block to mount the load cell to a base support.

21. A strain gage load cell according to claim 20, wherein a second plastic non-sensing element at the other end of said first and second beams serves as a load application block to receive a load platform.

22. A strain gage load cell according to claim 21, wherein said second plastic non-sensing element is formed with a fold-back arm positioned generally centrally between said first and second beams to receive a load platform thereon.

23. A strain gage load cell according to claim 22, wherein said first plastic non-sensing element is formed with a fold-back arm positioned generally centrally between said first and second beams to mount the load cell to a base support.

24. A strain gage load cell according to claim 22, wherein said first plastic non-sensing element is formed with a pair of fold-back arms positioned outside and generally parallel to said first and second beams to mount the load cell to a base support.

25. A strain gage load cell according to claim 23, wherein at least said plastic mounting block or load application block is injected molded with an integral cavity formed therein for housing interconnections between strain gages or other electronic components for the load cell.

26. A strain gage load cell according to claim 24, wherein at least said plastic mounting block or load application block is injected molded with an integral cavity formed therein for housing interconnections between strain gages or other electronic components for the load cell.

27. A strain gage load cell according to claim 1, wherein said non-sensing element is formed of an injection molded plastic and said sensing element has a gripping surface embedded in said injected molded plastic non-sensing element.

28. A strain gage load cell according to claim 27, wherein said load sensing element comprises a first beam formed of a flat piece of transducer quality metal alloy and having ends with gripping surfaces in the form of holes or notches, and plastic non-sensing elements are injection molded over said first beam ends.

29. A strain gage load cell according to claim 28, wherein said load sensing element further comprises a second beam having a similar formation as said first beam, and wherein plastic non-sensing elements are injection molded over the ends of both said first and second beams so said first and second beams are fixed in parallel relationship to each other.

30. A strain gage load cell according to claim 29, wherein said first and second beams are coplanar, and at least one of said non-sensing elements forms a fold-back arm so the beams are forced to act as guided bending beams.

31. A strain gage load cell according to claim 29, wherein said first and second beams are arranged spaced apart on top of each other to form a double bending beam load sensing structure, and said plastic non-sensing elements serve as a mounting block and a load application block.

32. A strain gage load cell according to claim 31, wherein at least said plastic mounting block or load application block is injected molded with an integral cavity formed therein for housing interconnections between strain gages or other electronic components for the load cell.

33. A strain gage load cell according to claim 29, wherein a first plastic non-sensing element at one end of said first and second beams serves a mounting block to mount the load cell to a base support.

34. A strain gage load cell according to claim 33, wherein a second plastic non-sensing element at the other end of said first and second beams serves as a load application block to receive a load platform.

35. A strain gage load cell according to claim 34, wherein said second plastic non-sensing element is formed with a fold-back arm positioned generally centrally between said first and second beams to receive a load platform thereon.

36. A strain gage load cell according to claim 35, wherein said first plastic non-sensing element is formed with a fold-back arm positioned generally centrally between said first and second beams to mount the load cell to a base support.

37. A strain gage load cell according to claim 35, wherein said first plastic non-sensing element is formed with a pair of fold-back arms positioned outside and generally parallel to said first and second beams to mount the load cell to a base support.

38. A strain gage load cell according to claim 36, wherein at least said plastic mounting block or load application block is injected molded with an integral cavity formed therein for housing interconnections between strain gages or other electronic components for the load cell.

39. A strain gage load cell according to claim 37, wherein at least said plastic mounting block or load application block is injected molded with an integral cavity formed therein for housing interconnections between strain gages or other electronic components for the load cell.

* * * * *